(12) United States Patent
Moyer (10) Patent No.: US 8,756,405 B2
(45) Date of Patent: Jun. 17, 2014

(54) SELECTIVE ROUTING OF LOCAL MEMORY ACCESSES AND DEVICE THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 614 days.

(21) Appl. No.: 13/103,609

(22) Filed: May 9, 2011

(65) Prior Publication Data

US 2012/0290806 A1 Nov. 15, 2012

(51) Int. Cl.
*G06F 12/00* (2006.01)

(52) U.S. Cl.
USPC .......................................................... 712/225

(58) Field of Classification Search
CPC combination set(s) only.
See application file for complete search history.

(56) References Cited

U.S. PATENT DOCUMENTS

| | | | |
|---|---|---|---|
| 5,410,669 A | 4/1995 | Biggs et al. | |
| 5,532,947 A | 7/1996 | Potter et al. | |
| 5,966,734 A | 10/1999 | Mohamed et al. | |
| 6,115,792 A | 9/2000 | Tran | |
| 6,138,223 A | 10/2000 | Check et al. | |
| 6,438,671 B1 | 8/2002 | Doing et al. | |
| 6,484,237 B1 | 11/2002 | Agarwala et al. | |
| 6,636,950 B1 * | 10/2003 | Mithal et al. | 711/147 |
| 6,748,498 B2 * | 6/2004 | Gharachorloo et al. | 711/141 |
| 6,941,421 B2 | 9/2005 | Luick | |
| 6,963,965 B1 | 11/2005 | Anderson | |
| 6,976,126 B2 | 12/2005 | Clegg et al. | |
| 7,437,535 B1 | 10/2008 | Joffe et al. | |
| 7,529,889 B2 | 5/2009 | Vasekin et al. | |
| 7,548,483 B2 | 6/2009 | Cullum et al. | |
| 8,200,934 B2 * | 6/2012 | Kasahara et al. | 711/168 |
| 2005/0091476 A1 | 4/2005 | Doing et al. | |
| 2006/0271738 A1 * | 11/2006 | Tran et al. | 711/122 |
| 2006/0294326 A1 * | 12/2006 | Jacobson et al. | 711/156 |
| 2007/0150671 A1 | 6/2007 | Kurland | |
| 2008/0046653 A1 | 2/2008 | Knoth et al. | |
| 2008/0086617 A1 * | 4/2008 | Kasahara et al. | 711/167 |
| 2010/0106872 A1 | 4/2010 | Moyer et al. | |
| 2010/0107243 A1 | 4/2010 | Moyer et al. | |
| 2010/0223447 A1 | 9/2010 | Serebrin | |
| 2012/0198156 A1 | 8/2012 | Moyer | |
| 2012/0198177 A1 | 8/2012 | Moyer | |
| 2012/0290780 A1 | 11/2012 | Kinter et al. | |

OTHER PUBLICATIONS

U.S. Appl. No. 13/016,371, filed Jan. 28, 2011, entitled "Selective Memory Access to Different Local Memory Ports and Method Thereof," William C. Moyer.
Notice of Allowance mailed Apr. 26, 2013 for U.S. Appl. No. 13/016,371, 13 pages.

* cited by examiner

*Primary Examiner* — Eric Coleman (57) ABSTRACT

A data processor is disclosed that accesses its local memory by routing requests through a data path that is external the data processor. A reservation/decoration controller implements specialized handling associated with a received request to access local memory. In addition to implementing special handling, a memory controller that is associated with the reservation/decoration controller routes a corresponding access request back to the data processor core to access its local memory.

20 Claims, 5 Drawing Sheets

SELECTIVE ROUTING OF LOCAL MEMORY ACCESSES AND DEVICE THEREOF

CROSS-REFERENCE TO RELATED APPLICATIONS

The present application is related to co-pending U.S. patent application Ser. No. 13/016,371 entitled "Selective Memory Access to Different Local Memory Ports and Method Thereof," listing as inventor William C. Moyer.

BACKGROUND

1. Field of the Disclosure

The present disclosure relates generally to electronic devices, and more particularly, to accessing memory of data processor devices.

2. Description of the Related Art

Data processor cores generally include an instruction execution pipeline that includes various stages that control execution of instructions. One stage of the instruction execution pipeline provides instruction information, such as effective address input operands, to a load/store unit that uses the instruction information to determine a target memory location to be accessed. Information is retrieved from (read) the target memory in response to a load request and provided to (written) the target memory location response to a store request.

Certain types of instructions, referred to herein as specialized instructions, need to have their corresponding load and store requests manipulated in a specialized manner that not only implements the primary read and write functions of a respective load or store request, but also implements special handling of the request. Two examples, of specialized instructions include atomic instructions, which require one or more memory accesses be completed in an uninterrupted manner, and decorated instructions, which cause a data access to be manipulated in a particular manner in addition to implementing its primary function. Execution of an atomic instruction results in a corresponding atomic access request being provided to the load/store unit, while execution of a decorated access instruction results in a corresponding atomic access request being provided to the load/store unit. The additional hardware overhead needed by a data processor core to implement the specialized handling needed by specialized instructions can increase the size of the data processor core. In addition, implementation of specialized requests, such as atomic requests, at a data processor core can result in the in bus locking operations, or other delays, that can affect subsequent accesses to a memory location. This delay can be especially problematic when it prevents access to information stored at a local memory of a data processor core that is needed to complete the execution of other instructions.

BRIEF DESCRIPTION OF THE DRAWINGS

The present disclosure may be better understood, and its numerous features and advantages made apparent to those skilled in the art by referencing the accompanying drawings.

DETAILED DESCRIPTION

There is herein described a data processing system that has one or more data processor cores each having an instruction pipeline, a load/store unit and a local memory. Responsive to execution of an instruction by a data processor core that needs to access data stored at its local memory, the load/store unit of the data processor will selectively route one of a local access request or an external access request to the local memory. In particular, a local access request will be routed to the local memory when the current instruction is a normal instruction, while an external access request will be used to access the local memory when the current instruction being executed is a specialized instruction.

With respect to the present disclosure, the term "local access," and its variants, when used with respect to the flow of access information, such as load/store requests, between two resources of a common data processor core is intended to mean that the flow of information occurs entirely within the data processor core. In addition the term "external access," and its variants, when used with respect to the flow of access information, such as load/store requests, between two resources is intended to mean that at least a portion of the flow of information occurs external to the data processor. For example, a local access request by a data processor core to its local memory is an access request that is routed to the local memory using circuitry that is entirely local to the data processor core. An external access request by a data processor core to its local memory is an access request that is routed to the local memory using circuitry that includes circuitry external to the data processor core.

Routing a local memory access request to an external resource for handling prior to being further routed to the local memory allows for resources external the data processor core (external resources) to implement specialized handling associated with specialized access requests. The ability to implement specialized handling of an access request by external resources reduces the hardware overhead needed at the data processor core that would otherwise be needed to be implemented at a data processor core to implement the specialized handling features. A particular embodiment of the present disclosure is described with reference to FIGS. 1-5.

Figure 1:
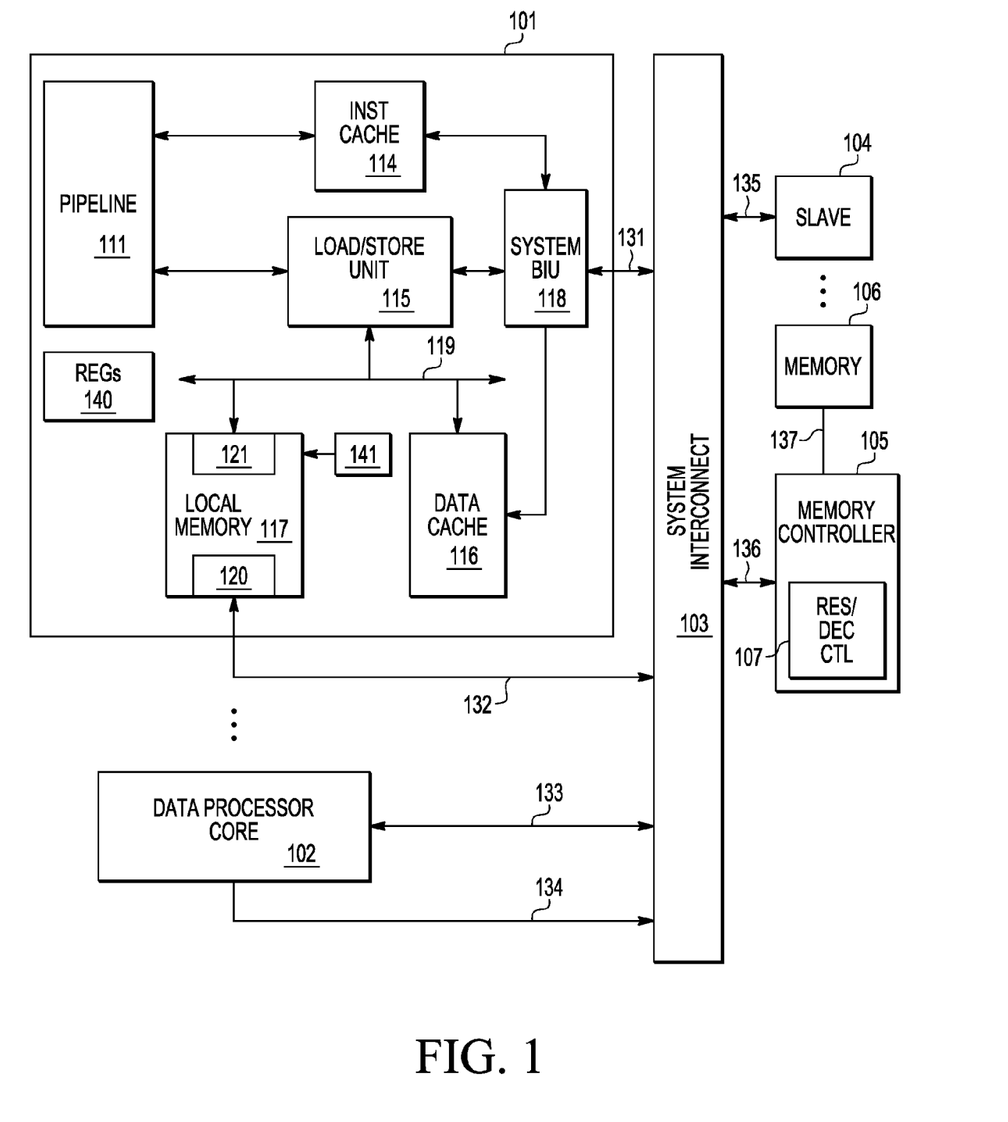
FIG. 1 is a block diagram illustrating a data processing system.

FIG. 1 illustrates a data processing system 100 that includes one or more data processor cores 101-102, busses 131-137, a system interconnect 103, and one or more peripherals 104-106. Each of the illustrated elements of FIG. 1 can be part of a common semiconductor substrate, part of a common package, part of a common circuit board, the like, or combinations thereof. For example, memory 106 can be integrated at the same semiconductor substrate as data processor cores 101-102, memory controller 105, and system interconnect 103, while other peripheral devices need not be integrated at the same semiconductor substrate.

One or more of the busses 131-136 connect each of the data processor cores 101-102 and peripherals 104-106 to system interconnect 103. System interconnect 103 can represent a cross-point switch, or other interconnect module, that facilitates communication of information amongst each of the data processor cores 101-102 and peripherals 104-106 based upon address information. Peripheral 104 is illustrated to be a slave device, such as a memory or other device, capable of being accessed to receive or provide information via the system interconnect 103.

Peripheral 106 is a memory device, also referred to as memory 106, such as a volatile memory device or a non-volatile memory device, that can receive or provide information in response to access requests. Access requests to memory 106 can be routed through both system interconnect 103 and memory controller 105 as illustrated, or access requests to memory 106 can be routed through system interconnect 103 to memory 106, but not via memory controller 105 (not illustrated). In a particular embodiment, memory controller 105 is a peripheral that can receive and manage access requests associated with predefined ranges of the address map of data processor system 100. For example, the addresses of memory 106 can be mapped in the address space of data processor system 100 such that all requests to access memory 106, whether a normal access request or a specialized access request, are routed to the memory controller 105 by the system interconnect 103. Alternatively, the addresses of memory 106 can be mapped to the system 100 such that normal access requests are routed by the system interconnect 103 directly to memory 106 without passing through memory controller 105, and specialized access requests to memory 106, e.g., those requests that are tagged as special by the data processor core 101 are routed by the system interconnect 103 to the memory controller 105 for special handling prior to an access being provided to the memory 106.

According to a particular embodiment, a data processor core can request information from its own local memory by providing to the system interconnect 103 an access request having access information, such as an address, that identifies the local memory. In response, the interconnect 103 will route the request to the memory controller 105 for handling. For example, access requests to retrieve information stored at a local memory of data processor core 101 can be provided from data processor core 101 to system interconnect 103, which will provide the access request to memory controller 105 for additional handling. The memory controller 105 will implement any special handling associated with the request, if any is required. After receiving the request, and implementing any required special handling, the memory controller 105 provides to the system interconnect 103 an access request identifying the target location of local memory of data processor core 101. The system interconnect 103 determines that the local memory of data processor core 101 is the target of the request and routes the access request to a port 120 of the data processor core 101. Data retrieved from local memory of data processor core 101 is routed back to the load/store unit using the same data path in reverse, e.g., from port 120 of data processor core 101 through interconnect 103 to memory controller 105 (as necessary), through interconnect 103 to the system bus interface unit 118. The manner in which a data processor core 101 determines whether to implement a local access or an external access to retrieve information from its local memory will be better understood with reference to a particular data processor core.

Data processor cores 101-102 of FIG. 1 may be any type of data processor cores. They can be of the same type or of different types. For purposes of discussion, it is assumed that each of the plurality of data processor cores 101-102 is of the same type, as illustrated in greater detail by data processor core 101, and, therefore, each include respective local resources, respectively. For example, data processor core 101 is illustrated to include local resources that include an execution pipeline 111, an instruction cache 114, a data cache 116, a local memory 117, a system bus interface unit 118, a load/store unit 115, registers 140, and various local busses connecting the data processor core 101 resources to each other.

Resources external to data processor core 101 include busses 131-137, system interconnect 103, and peripherals and memory 104-106.

The registers 140 are user programmable, and can include address registers, data registers, a base address register 141, control information, and the like.

Pipeline 111 is connected to the instruction cache 114, the load/store unit 115, and to the set of registers 140. The pipeline 111 communicates with the load/store unit 115 to access memory locations that store instruction operands, or to where results are to be stored. By way of example, access requests described herein are typically described as being load requests, though it will be appreciated that the techniques described are also applicable to store requests.

A local bus 119 is connected to the load/store unit 115, to port 121 of the local data memory 117, and to a data cache 116. A system bus interface unit (BIU) 118 of the data processor core 101 includes multiple ports, including a port connected to system interconnect 103 (via bus 131), a port connected to the instruction cache 114, a port connected to the load/store unit 115, and a port connected to data cache 116. In addition to port 121, local data memory 117 includes an additional port 120 that can be a slave bus interface unit that is connected to the system interconnect 103 via a bus 132, which is external to the data processor core 101. Because local bus 119 is local to the data processor core 101, it is independent from the busses 131-136 that are connected to system interconnect 103. This independence is such that information can be transmitted between elements of data processor core 101 over local bus 119 simultaneously with information being transmitted between data processor core 101 and another external resource over at least one of the busses 131 and 132 via interconnect 103.

During operation of the data processor core 101, execution pipeline 111 controls various processing functions associated with the execution of instructions. These various functions can include: providing instruction fetch requests to the instruction cache 114 to request instructions; decoding fetched instructions; determining and providing data access requests to request instruction operands from memory; determining and providing arithmetic commands to at least one Arithmetic Logic Unit (ALU), such as an integer or floating point ALU, based upon decoded instructions; determining and providing data access requests that store results to memory; and the like.

The instruction cache 114 receives fetch requests from the execution pipeline 111 and will provide the requested instruction from a cache array, if available, or will provide an access request for the needed instruction to the system BIU 118. Similarly, the execution pipeline 111 will provide a load access request that can include a load access request and one or more effective address input operands associated with an instruction being executed (a current access instruction) to the load/store unit 115 to retrieve instruction operands for use by the pipeline 111.

The load/store unit 115 decodes the load request and its effective address input operands to determine a target address that will be provided by the load store unit 115 along with other access information, as needed, to access the target device. The load/store unit 115 can access information from local memory 117 using either a local access request or an external access request. For example, the load/store unit 115 can route access requests locally to port 121 of local memory 117 via local bus 119, or can route access requests external the data processor core to port 120 of the local memory 117 via a data path that includes the system bus interface unit 118, the system interconnect 103, and memory controller 105.

In accordance with a specific embodiment described herein, whether the load/store unit 115 routes an access request to local memory 117 via a local access request or via an external access request is based upon whether the access request is a normal data access request or a specialized data access request as determined by pipeline 111 during instruction decode. For example, the pipeline 111 will provide a corresponding atomic access request to the load/store unit 115 for processing when it is determined that an atomic access instruction is being executed. Similarly, the pipeline 111 will determine when a decorated access instruction is being executed, and in response will provide a decoration value that indicates how access information associated with an access request is to be manipulated by a decoration controller 107, which in an embodiment, is contained within a portion of memory controller 105. The decoration value can be stored at a general purpose register that is accessed by the decoration controller during processing of a decoration request. In an alternate embodiment, the decoration value is provided to the load/store unit 115 as part of a decorated access request that is subsequently forwarded to the decoration controller by the load/store unit 115 as part of the access information used to perform an external access. The handling of decoration requests may result in operations that that provide a request to perform multiple memory accesses which implement read-modify-write operations, or other types of specialized sequenced memory operations. Such sequenced operations consist of indivisible sets of operations, allowing memory controller 105 to implement such indivisible sequences transparently for the benefit of data processor core 101. Such sequences may include test-and-set operations, compare and swap operations, test and increment/decrement, and other operations as further described herein, which are not directly supported by load/store unit 115.

Figure 2:
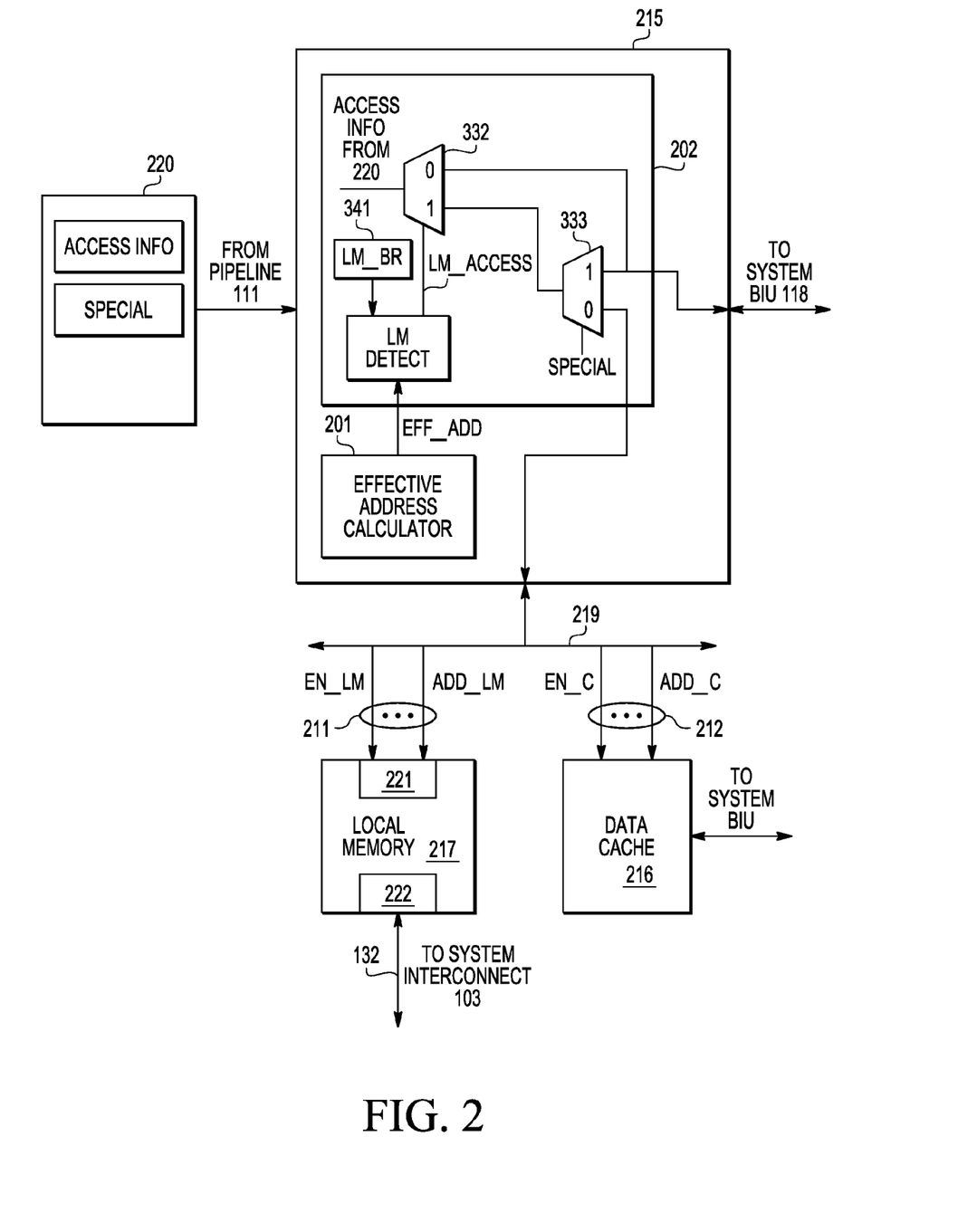
FIG. 2 is a block diagram of a particular embodiment of a portion of the data processing system of FIG. 1.

Operation of the load/store unit 115 will be better understood with reference to FIG. 2, which illustrates a portion of the data processor core 101 including a local memory 217, a data cache 216, a detailed view of a load/store unit 215, and a local bus 219, each of which are specific implementations of their similarly numbered counterparts (117, 116, 115, and 119) illustrated at FIG. 1.

Bus 219 is illustrated to include portion 211 and portion 212. Portion 211 is that part of bus 219 that communicates control and address information between the load/store unit 215 and the local memory 217. Portion 212 is that part of bus 219 that communicates control and address information between load/store unit 215 and the data cache 216.

Load/store unit 205 is illustrated in greater detail to include an address calculation module 201 and a routing module 202. The address calculation module 201 decodes access information 220 received from the pipeline 111 to determine a target address, labeled MEM_ADD, of a target memory device. The routing module 202 uses the target address and other information from the instruction pipeline 111 to determine how an access request will be routed to the target memory device. The routing of access requests by the routing module 202 will be better understood by the detailed functional block diagram of the load/store unit 205 at FIG. 2

The load/store unit 205 is illustrated to include a local memory detect module 331, and de-multiplexors 332 and 333. In addition, the load/store unit 205 accesses a register 341 that stores a value LM_BR to indicate a base address of the local memory 217 and can be user programmable. Based upon the base address and the size of the local memory 217, the local memory detect module 201 determines whether the decoded address, MEM_ADD, is associated with an address of local memory 217 or an address of external memory. If the decoded address is associated with an address of local memory 217, the signal LM_ACCESS is asserted, otherwise, the signal LM_ACCESS is negated.

In response to LM_ACCESS being negated, a path through de-multiplexor 332 is selected to provide the current instruction's access information to the bus interface unit 118 for further routing as an access request to resources external the data processor core 101. Note that for simplicity, the description herein does not describe data cache 116 as being involved with the access of information. However, in actuality, the data cache 116 can be accessed by the load/store unit 115, and upon a cache miss the bus interface unit 118 would proceed externally with the data access. For example, the bus interface unit 118 will provide an access request to the interconnect 103 based upon the access information. Interconnect 103 will further route the access request to the memory controller 105 or another destination external to the data processor core 101. Otherwise, in response to LM_ACCESS being asserted, a path through de-multiplexor 332 is selected to provide the access information to de-multiplexor 333.

De-multiplexor 333 is controlled by a signal labeled SP that is asserted when information at pipeline 111 indicates the current instruction is a specialized instruction, and is negated when the information at pipeline 111 indicates the current instruction is a normal instruction. In response to the current instruction being a normal instruction, a path through de-multiplexer 333 is selected to provide a local access request to local memory 217, e.g., an access request to port 221 of local memory 217 via the bus 219. Otherwise, in response to the current instruction being a special instruction, a path through de-multiplexor 333 is selected to provide an external access request to local memory 217. For example, an external access request based on the access information can be provided to the interconnect 103 via the bus interface unit 218. The interconnect 103 further routes the access request to the memory controller 105, which will implement special processing, if needed, and provide an access request to the port 222 of local memory 217 via system interconnect 103 to request information at the target memory location.

The information stored at the target memory location is routed back to the bus interface unit 218 of data processor core 101 via system bus 103. It will be appreciated that the return route can include the memory controller 105, and that depending on the type of specialized access request, memory controller 105 may perform a sequence of memory access and modification operations in response to the access request.

Aspects of specialized access requests that are not primary functions can be handled at the memory controller 105 by the reservation/decoration controller 107 as described in greater detail below for atomic access requests and decorated access requests.

An atomic access request is a request that ensures that a memory location being accessed by that request is accessed without interruption, e.g., without being accessed by another device. Atomicity of an atomic request can be ensured by monitoring a particular memory location where an atomic access is being performed, and notifying the requesting device, e.g., data processor core 101, if the memory location is accessed by a request other than the atomic request. For example, when the memory controller 105 is processing an atomic load-and-reserve request, the reservation/decoration controller 107 can be used to implement a reservation that corresponds to the target memory location. In one embodiment, the reservation/decoration controller 107 sets a reservation by latching the address of the memory location being atomically accessed and latching an indicator identifying the requesting master of a reservation. The reservation will be cleared (lost) by the reservation/decoration controller 107 if another master attempts to modify the information at the memory location, or attempts to obtain a reservation for the memory location via an atomic load-and-reserve operation. As a result, the reservation/decoration controller 107 may detect that the reservation has been cleared and cause a subsequent reservation store (a conditional store) to fail. In one embodiment, the store conditional failure results in a condition code being set to indicate to the data processor core 101 that the failure has occurred. Software can query the condition code and retry the operation if unsuccessful. In this manner, the use of semaphores to ensure atomicity is used without the need for bus locking operations. Another way of ensuring atomicity of an access request is guarantee that no other accesses to the same memory location can occur until the memory is released by the first access request, e.g., the system is designed to prevent any other resource from concurrently accessing a memory location that is currently subject to an atomic access.

Another type of specialized instruction is a decorated access instruction. Execution of a decorated access instruction by pipeline 111 results in a decoration value being communicated to the load/store unit 115. The decoration value is information that is used to indicate to the reservation/decoration controller 107 how to manipulate information being provided to, or requested from, a target device. According to one embodiment, execution of the decoration instruction results in the decoration value being stored in a general purpose register that is accessed by the reservation/decoration controller 107 during processing of the decoration request. In an alternate embodiment, the decoration value is transmitted by the load/store unit 115, e.g., from a general purpose or other register, to the decoration controller along with other access information, such as a memory address being accessed, for handling.

Responsive to a decoration request being executed, the memory controller 105 will use the reservation/decoration controller 107 to perform a special function during execution of the access request in addition a primary access function, e.g., read or write, of the access instruction. For example, the primary function of a decorated request that is being executed may be a load request. However, the decoration function of the decorated request may be to modify the read value after it is retrieved, but before it is returned to the requesting device, or to modify a read value and store the modified value back at the target location. For example, the information being accessed could be multiplied or incremented by a value before being returned to a requesting device (during a read access) or before being stored to memory (during a read or a write access). In another embodiment, the decoration function can control a location where information is being stored. For example, a decoration value can indicate a particular bit location where a provided data value is to be stored within a data word, or to indicate a particular bit location where a data value is to be returned to the requesting device.

It will be understood that any number of various additional or alternate processing functions may be implemented in response to a decoration instruction being executed, and that decoration value is not generally interpreted by the pipeline of the data processor core. Note that a decoration request can also be an atomic request as described above. Since the reservation/decoration controller 107 is used to implement the decoration, the function of the decoration can be made indivisible by the reservation/decoration controller 107 without the need for long latency interactions with a request data processor core, and without the need to obtain a reservation for the memory location.

Figure 3:
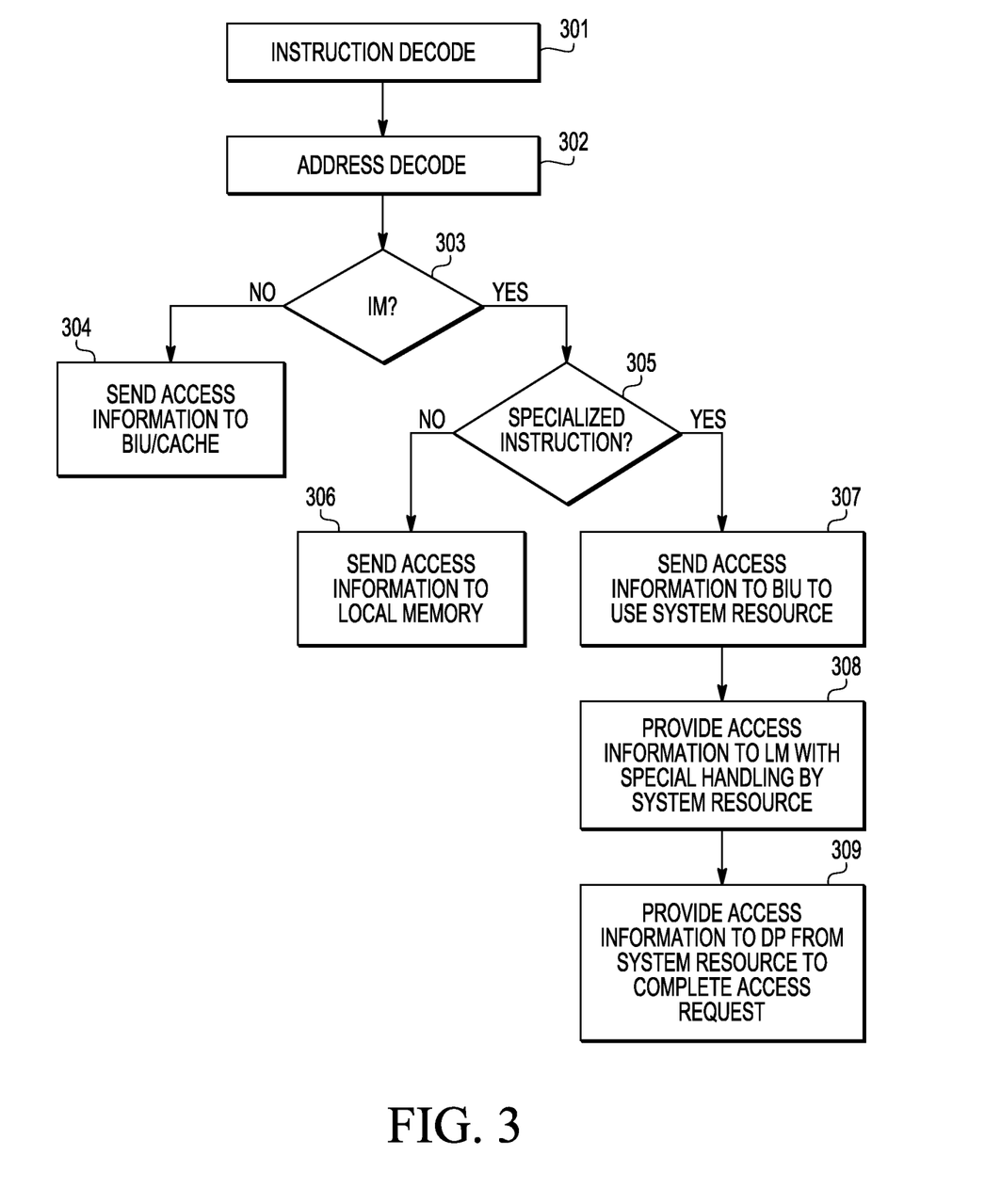
FIG. 3 illustrates a flow diagram in accordance with a particular embodiment of the present disclosure.

FIG. 3 illustrates a flow diagram representing a particular method of selectively routing access information to a local memory via one of two data paths—one data path being local to a data processor core and the other alternate data path including resources external to the data processor core (external resources). At operation 301, execution of a fetched instruction begins at an execution pipeline of a data processor core, wherein the instruction is decoded. Based upon the decoded information a load/store request can be provided to a load/store unit. The request provided to the load/store unit can include embedded information that indicates the request is a specialized request. For example, the embedded information can be inherent to a command portion of the request, such as an opcode or other indicator, or included as data field information associated with request. Alternatively, the request can be a generic request that can be treated as either a normal or specialized request depending upon a value stored at a register. At operation 302, an address decode occurs at the load store unit based upon access information from the current instruction that identifies a memory location of a target device containing information to be accessed.

At operation 303 it is determined whether the target memory identified at operation 302 corresponds to a local memory of the data processor core. Flow proceeds to operation 305 in response to the decode process determining that the target memory is a local memory of the data processor core. Otherwise, flow proceeds to operation 304 wherein the access information is selectively routed externally to the data processor core to access a non-local memory. For example, referring to FIG. 1, the access information could be routed to the memory controller 105, which will access the information from memory 106 in a normal manner or in a special manner depending upon whether the instruction is a specialized access instruction.

At operation 305, after determining at operation 303 that the current access is to local memory, it is determined whether the access to local memory corresponds to a specialized access request, such as an atomic access request or a decorated access request. Whether an access request is an atomic access request can be determined based upon access information determined during decoding at operation 301, and can be stored during instruction decoding at a register location. For example, an indicator can be set at a register location during instruction decoding that indicates the current access request is a special access request. Alternatively an indicator can be communicated directly to load/store unit. Flow proceeds to operation 306 in response to the decode process determining that the access request is a normal request, wherein access information is selectively routed internally to the data processor core, e.g., an access request is selectively routed to the local memory without using any transaction external to the data processor core, where an external transaction can be an operation or function performed by an external resource. Otherwise, flow proceeds to operation 307 for special handling.

At operation 307, in response to the decode process determining that the access request is a specialized request, the access information is selectively routed to one or more resources that are external the data processor core by being provided to a bus interface unit of the data processor core from the load/store unit. The one or more external resources implement one or more external transactions that access the local memory based upon the access information. At operation 308, an external resource implements any specialized processing needed before sending an access request to the local memory of the data processor core. For example, the specialized processing can set a reservation that correlates to the memory location being accessed to indicate an atomic access of the memory is in progress, or access information to be stored at the local memory can be manipulated prior to being stored. After special processing is completed, the access information is used to provide an access request to the local memory of the data processor core. In one embodiment, the access request is provided to a slave port of the local memory that is not controlled by the bus interface unit. Alternatively, the external resource can provide the access request to the local memory via the bus interface unit of the data processor core.

At operation 309, the external resource implements any specialized processing needed after accessing information stored at the local memory and prior to completing the access. For example, the special processing after the data is accessed at local memory can include clearing reservations to the particular address, or reporting invalid reservations to the requesting device if it is determined they are no longer valid. In another embodiment, the access can be completed by utilizing decoration operation information from the data processor core for additional processing by the memory controller, using a sequence of memory accesses and data processing operations. In yet another embodiment, the external resource can be completed by storing the decorated information back to the local memory, e.g., as part of a read-modify-write request, before being completed. Information retrieved during a decoration access can also be returned to the requesting device, e.g., the pipeline of the data processor core, for use as an instruction operand.

Figure 4:
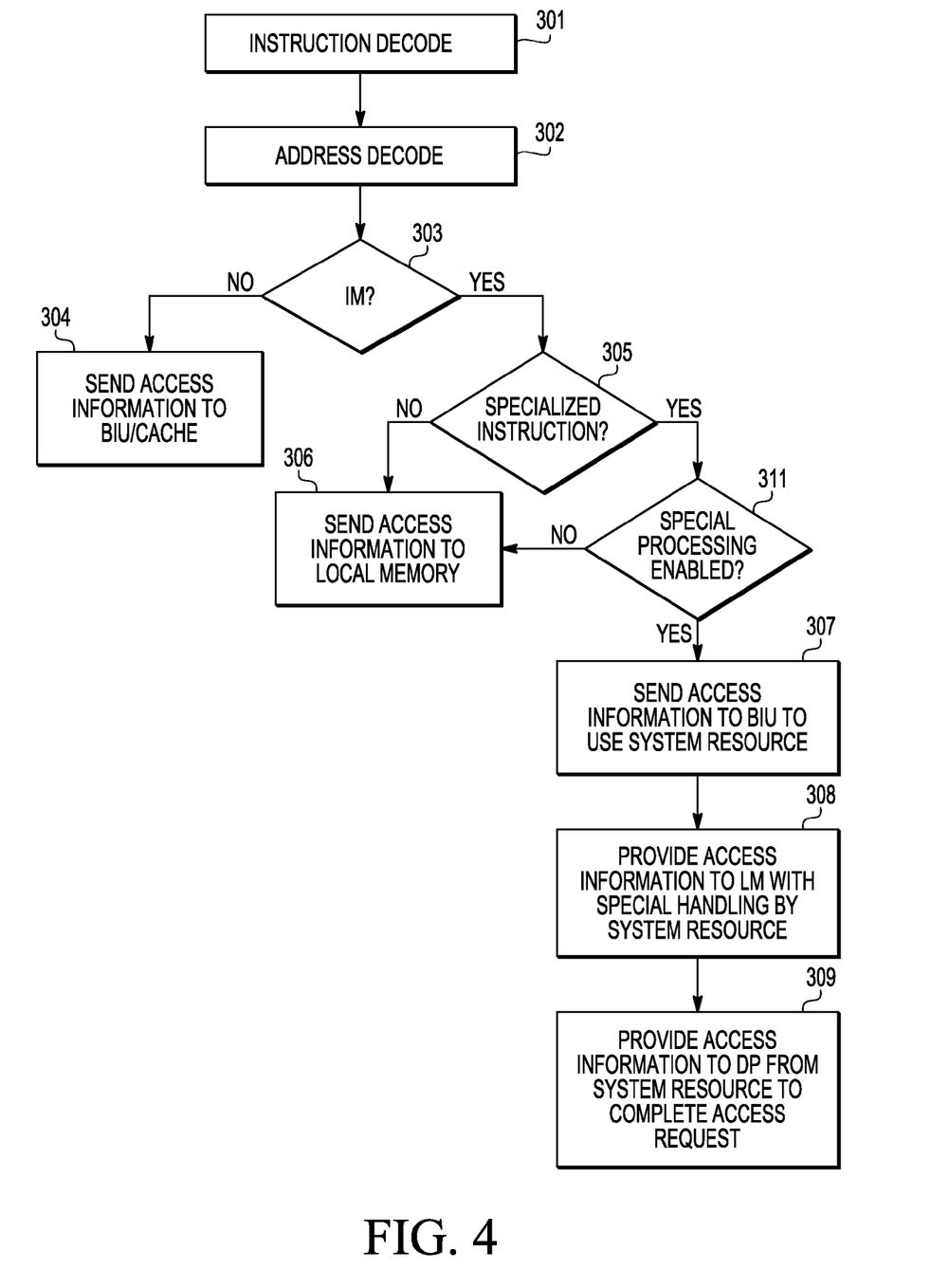
FIG. 4 illustrates a flow diagram in accordance with a particular embodiment of the present disclosure.
Figure 5:
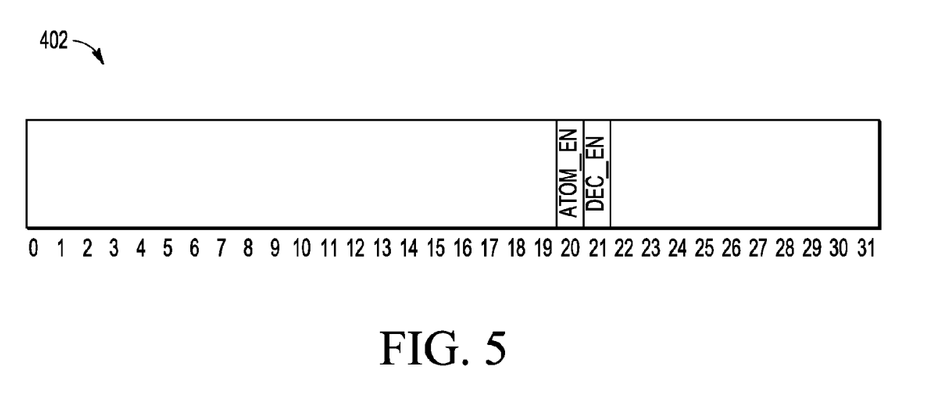
FIG. 5 illustrates a block diagram of a control register in accordance with a particular embodiment of the disclosure.

FIG. 4 illustrates a flow diagram representing a particular method in accordance with the present disclosure, wherein operations having similar reference numbers as the operation of FIG. 4 have the same function. The method of FIG. 4 varies from the flow of FIG. 3 in that from operation 305 flow proceeds to operation 311, instead of directly to operation 307, in response to determining an access to local memory is a specialized access instruction. At operation 311, it is determined whether specialized processing is enabled. For example, a programmable register indicator can be set to indicate whether a particular type of special processing is available. Referring to FIG. 5, a programmable register location 402 can include a bit labeled ATOM_EN, which when enabled indicates atomic accesses are to be manipulated by special processing, and a bit labeled DEC_EN, which when enabled indicates decoration access are to be manipulated by special processing. Such a programmable register may be used to control the routing and operation of specialized access requests which are generated by load/store unit 115, to either bypass the local access path to the local memory within data processor core 101 and to utilize a resource such as memory controller 105 external to the data processor core, or, alternatively, to utilize internal pathways only in processing the load/store operation. Such selection allows for greater flexibility and efficiency in the operation of data processor core 101.

Therefore, in response to the bit field ATOM_EN being enabled, an atomic access request results in the flow proceeding to operation 307 to facilitate access of the requested information via resources external to the data processor core as previously described. In response to the bit field ATOM_EN being negated, an atomic access request results in the proceeding to operation 306 to facilitate a normal access of the requested information from local memory without using any transactions external the data processor core. Similarly, in response to the bit field DEC_EN being enabled, a decorated access request results in the flow proceeding to operation 307 to facilitate access of the requested information via resources external to the data processor core as previously described. In response to the bit field DEC_EN being negated, the decoration access request results in the flow proceeding to operation 306 to facilitate a normal access of the requested information from local memory without using any transactions external the data processor core. In an alternate embodiment, a single register bit could be used to enable/disable all special accesses, e.g., one bit enables/disables both atomic access requests and decorated access requests.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. For example, in the above described embodiment, the data processor 101 is described as implementing declaration requests in a normal manner, e.g., no manipulation, if the DEC_EN indicator is disabled. However, in an alternate embodiment, when the DEC_EN bit is disabled, a decoration value determined by the pipeline 111 results in the decoration of a local memory access occurring at a declaration controller (not shown) that is local to the data processor core 101, and when the DEC_EN bit is enabled, the decoration value will result the decoration of the local memory access occurring at an external declaration controller. In this manner, the same declaration value can be used to implement one of two different decoration functions depending upon the value of the DEC_EN bit.

As another example, an intervening access to a memory location being access atomically by another access can result in the reservation indicator being cleared if the intervening access is a store from the same master, or re-set if the intervening access is a load from the same master.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   determining that an access instruction being executed at a data processor core is or is not a specialized access instruction; and
   selectively routing access information based on the access instruction to access a local memory of the data processor core using a transaction external the data processor core responsive to determining that the access instruction is the specialized access instruction, wherein the specialized access instruction is at least one of an atomic access instruction or a decorated access instruction.

2. The method of claim 1 further comprising:
   selectively routing the access information to access the local memory of the data processor core using a transaction internal the data processor core responsive to determining that the access instruction is not the specialized access instruction.

3. The method of claim 2, wherein the determining is based upon information embedded in the access instruction.

4. The method of claim 2, wherein the determining based upon register information.

5. The method of claim 2, wherein using the transaction external the data processor core includes routing the access information from a port of the data processor core to a system resource external the data processor core, and the system resource used to route the access information to the data processor core to access the local memory.

6. The method of claim 5 further comprising: responsive to selectively routing the access information to the local memory, receiving at the system resource, from the local memory, data being accessed based on the access information.

7. The method of claim 2, wherein using the transaction external the data processor core includes routing the access information from a first port of the data processor core to a system resource external the data processor core that is used to route the access information to the data processor core via a second port of the data processor core to access the local memory.

8. The method of claim 5 further comprising: ensuring, at the system resource, that a memory associated with the access information is atomically accessed in response to the access instruction being an atomic access instruction.

9. The method of claim 5 further comprising: manipulating, at the system resource, access information to be stored at the local memory in response to the access instruction being a decorated access instruction.

10. The method of claim 1 further comprising determining whether a programmable indicator is in a first state that indicates that use of the transaction external the data processor core is enabled, or in a second state that indicates that use of the transaction external the data processor core is not enabled, and in response to determining that the programmable indicator is enabled implementing the selectively routing using the transaction external the data processor core, and in response to determining that the programmable indicator is not enabled selectively routing the access information from the specialized access instruction to the local memory without using any transaction external the data processor core responsive.

11. The method of claim 1, wherein the specialized access instruction is an atomic instruction.

12. The method of claim 1, wherein the specialized access instruction is a decorated access instruction.

13. A device comprising:
a plurality of data processor cores including a first data processor core comprising a first local memory;
a system resource module external the data processor core;
a system interconnect coupled to the system resource module and to the first data processor core; and
the first data processor core to selectively route access information associated with an access instruction being executed at an instruction processor pipeline of the first data processor core to the system resource module responsive to the access instruction being a specialized access instruction that includes at least one of an atomic access instruction or a decorated access instruction.

14. The device of claim 13, wherein the system resource module is to further route the access information to the first data processor core to access the first local memory in response to the access instruction being identified as the specialized access instruction.

15. The device of claim 13, wherein the instruction processor pipeline is to determine whether the access instruction is the specialized access instruction or not the specialized access instruction, the instruction processing pipeline to further, in response to determining the access instruction is not the specialized access instruction, to selectively route the access information associated with the access instruction to the local memory without using the system resource module, to allow the first local memory to be accessed local to the first data processor core.

16. The first data processor core of claim 13 further comprising a first port coupled the system interconnect and a second port coupled to the system interconnect, the first data processor core to selectively route the access information to the system resource module via the first port responsive to the access instruction being identified as the specialized access instruction, and the system resource module to provide the access information to the first local memory via the second port of the data processor.

17. The device of claim 13, wherein the plurality of data processor cores further includes a second data processor core coupled to the system interconnect, the second data processor core comprising a second local memory; and
the second data processor core to selectively route access information associated with an access instruction being executed at an instruction processor pipeline of the second data processor core to the system resource module, responsive to the second access instruction being identified as the specialized access instruction, wherein the system resource module is to further route the access information associated with the second data processor core to the second data processor core to access the second local memory.

18. The device of claim 17, wherein the system resource module is a memory controller that is to manipulates information being stored or retrieved.

19. The device of claim 13 further comprising a storage location to store an enable indicator, wherein the first data processor core further selectively routes the access information to the system resource responsive to the enable indicator being asserted, and selectively routes the access information to the local memory without using the system resource responsive to the enable indicator being negated.

20. A method comprising:
determining whether a first access request being executed at a first data processor core is an atomic access request to access a local memory of the first data processor core;
in response to determining the first access request is the atomic access request, ensuring the first access request is implemented in an atomic manner using a resource external the first data processor core to access the local memory of the first data processor core, otherwise, in response to determining the first access request is not the atomic access request, accessing the local memory of the first data processor core without using any resources external the data processor core;
determining whether a second access request being executed at a second data processor core is an atomic access request to access a local memory of the second data processor core;
in response to determining the second access request is an atomic access request, ensuring the second access request is implemented in the atomic manner using the resource external the first data processor core to access the local memory of the second data processor core, wherein the resource is also external the second data processor core; and in response to determining the second access request is not the atomic access request, accessing the local memory of the second processor core without using any resources external the second data processor core.

* * * * *